United States Patent
Jodoin

(10) Patent No.: US 12,275,375 B2
(45) Date of Patent: Apr. 15, 2025

(54) HELMET HOLDER

(71) Applicant: RACE CADDY, LLC, Barrington, IL (US)

(72) Inventor: John Luc Jodoin, Barrington, IL (US)

(73) Assignee: RACE CADDY, LLC, Barrington, IL (US)

( * ) Notice: Subject to any disclaimer, the term of this patent is extended or adjusted under 35 U.S.C. 154(b) by 0 days.

(21) Appl. No.: 18/422,079

(22) Filed: Jan. 25, 2024

(65) Prior Publication Data
US 2024/0157883 A1 May 16, 2024

Related U.S. Application Data

(63) Continuation of application No. 17/836,469, filed on Jun. 9, 2022, now Pat. No. 11,897,430.

(60) Provisional application No. 63/209,012, filed on Jun. 10, 2021.

(51) Int. Cl.
*B60R 7/10* (2006.01)

(52) U.S. Cl.
CPC .................... *B60R 7/10* (2013.01)

(58) Field of Classification Search
CPC ........................................................ B60R 7/10
See application file for complete search history.

(56) References Cited

U.S. PATENT DOCUMENTS

| | | | |
|---|---|---|---|
| 2,839,217 A * | 6/1958 | Trudeau | A45C 11/02 206/8 |
| 2,931,488 A * | 4/1960 | Trudeau | B65D 85/18 206/8 |
| 3,837,545 A | 9/1974 | Rogers, Jr. | |
| 5,607,067 A * | 3/1997 | Morrissey | B42D 5/005 248/205.2 |
| 5,823,328 A * | 10/1998 | Fomby | A45C 11/02 206/8 |
| 8,701,954 B1 | 4/2014 | Weinmeister | |
| 9,296,439 B2 * | 3/2016 | Magallanes | B62J 11/24 |
| 9,918,877 B2 | 3/2018 | Keller | |
| 11,897,430 B2 | 2/2024 | Jodoin | |
| 2003/0188448 A1 | 10/2003 | Reed | |
| 2004/0118888 A1 | 6/2004 | Russell | |
| 2016/0101926 A1 | 4/2016 | Tseng | |

OTHER PUBLICATIONS

"OG Racing Longacre Steering Wheel Hook" available online at: shorturl.at/efopv (available at least as early as Jun. 9, 2021) (4 pages).

"OMP NA/1864 Rally helmet box with wide side pockets, velour lining" available online at: shorturl.at/bcqx5 (available at least as early as Jun. 9, 2021) (2 pages).

"OMP NA/1858 Polyester helmet carrying net suitable for all car and is able to hold 2 helmets" available online at: shorturl.at/hInrD (available at least as early as Jun. 9, 2021) (2 pages).

* cited by examiner

*Primary Examiner* — Anita M King
(74) *Attorney, Agent, or Firm* — Barnes & Thornburg LLP

(57) ABSTRACT

A holder for retaining a helmet and a head and neck support device connected to the helmet. The holder has a base and a tongue. The base has a top surface and a u-shaped cavity extending into the base from the top surface. The u-shaped cavity generally has two arms and a bottom wall. The head and neck support device is retained in the u-shaped cavity, and the tongue assists in retaining the helmet.

18 Claims, 5 Drawing Sheets

HELMET HOLDER

CROSS-REFERENCE TO RELATED APPLICATIONS

This application claims the benefit of U.S. patent application Ser. No. 17/836,469, filed on Jun. 9, 2022, and U.S. Provisional Patent Application No. 63/209,012 filed Jun. 10, 2021, both of which are expressly incorporated herein by reference and made a part hereof.

FEDERALLY SPONSORED RESEARCH OR DEVELOPMENT

Not Applicable.

TECHNICAL FIELD

The present subject matter relates to a helmet holder, and more particularly, to an adjustable holder for use in a vehicle for retaining a helmet and a head and neck support device.

BACKGROUND

Helmet holders are known in the art. While such products according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a holder for use in a vehicle for retaining a helmet and a head and neck support device.

The disclosed technology further relates to a holder comprising: a base having a top surface, a bottom surface and sidewalls about a perimeter thereof, the sidewalls extending from the top surface to the bottom surface; a u-shaped cavity extending into the base from the top surface, the cavity having a bottom wall and an angled rear wall; a slot extending through the base from the bottom surface to the top surface, the slot being opposite the angled rear wall of the u-shaped cavity; a tongue having a post, a flange and a protrusion, wherein the post extends generally perpendicular to the flange, wherein the protrusion extends from the flange in a direction opposite the post and is configured to fit within the slot, and wherein the flange further has an opening to mate with a securing member, the tongue moving linearly about the slot of the base and the securing member securing the tongue in place on the base; and, a plurality of supports to support the base, wherein the base has openings in the sidewalls and wherein the supports are secured to the base with fasteners extending through the openings in the sidewalls, respectively.

The disclosed technology further relates to a holder comprising: a base having a top surface; a u-shaped cavity extending into the base from the top surface, the u-shaped cavity having two arms and a bottom wall; a slot extending through the top surface of the base at least partially between the two arms of the u-shaped cavity, the slot being adjacent the u-shaped cavity; and, a tongue having a post, the tongue secured to the base and moving linearly about the slot.

The disclosed technology further relates to a holder comprising: a base having a top surface; a cavity extending into the base from the top surface, the cavity having a bottom wall; a slot extending through the top surface of the base, the slot being adjacent the cavity; a tongue having a post, the tongue secured to the base and moving linearly about the slot; and, a plurality of supports secured to the base to support the base.

The disclosed technology further relates to a holder wherein the base has a bottom surface and sidewalls about a perimeter thereof, the sidewalls extending from the top surface to the bottom surface.

The disclosed technology further relates to a holder wherein the cavity is u-shaped.

The disclosed technology further relates to a holder wherein the cavity has an angled rear wall.

The disclosed technology further relates to a holder wherein the slot is opposite the angled rear wall of the u-shaped cavity.

The disclosed technology further relates to a holder further comprising additional cavities extending into the base from the top surface of the base.

The disclosed technology further relates to a holder comprising a lip about a perimeter of the base extending distal the top surface.

The disclosed technology further relates to a holder wherein the tongue also has a flange extending generally perpendicular to the post, wherein the flange has a protrusion that extends from the flange in a direction opposite the post and is configured to fit within the slot, and wherein the flange further has an opening to mate with a securing member, the tongue moving linearly about the slot of the base and the securing member securing the tongue in place on the base.

The disclosed technology further relates to a holder wherein the post of the tongue has a convex outer surface.

The disclosed technology further relates to a holder further comprising a plurality of supports secured to the base to support the base.

The disclosed technology further relates to a holder wherein the supports comprise angle brackets, and wherein the supports have openings to secure the supports to a vehicle.

The disclosed technology further relates to a holder wherein the base has sidewalls, wherein the sidewalls have openings, and wherein the supports are secured to the base with fasteners extending through the openings in the sidewalls, respectively.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings.

Figure 1:
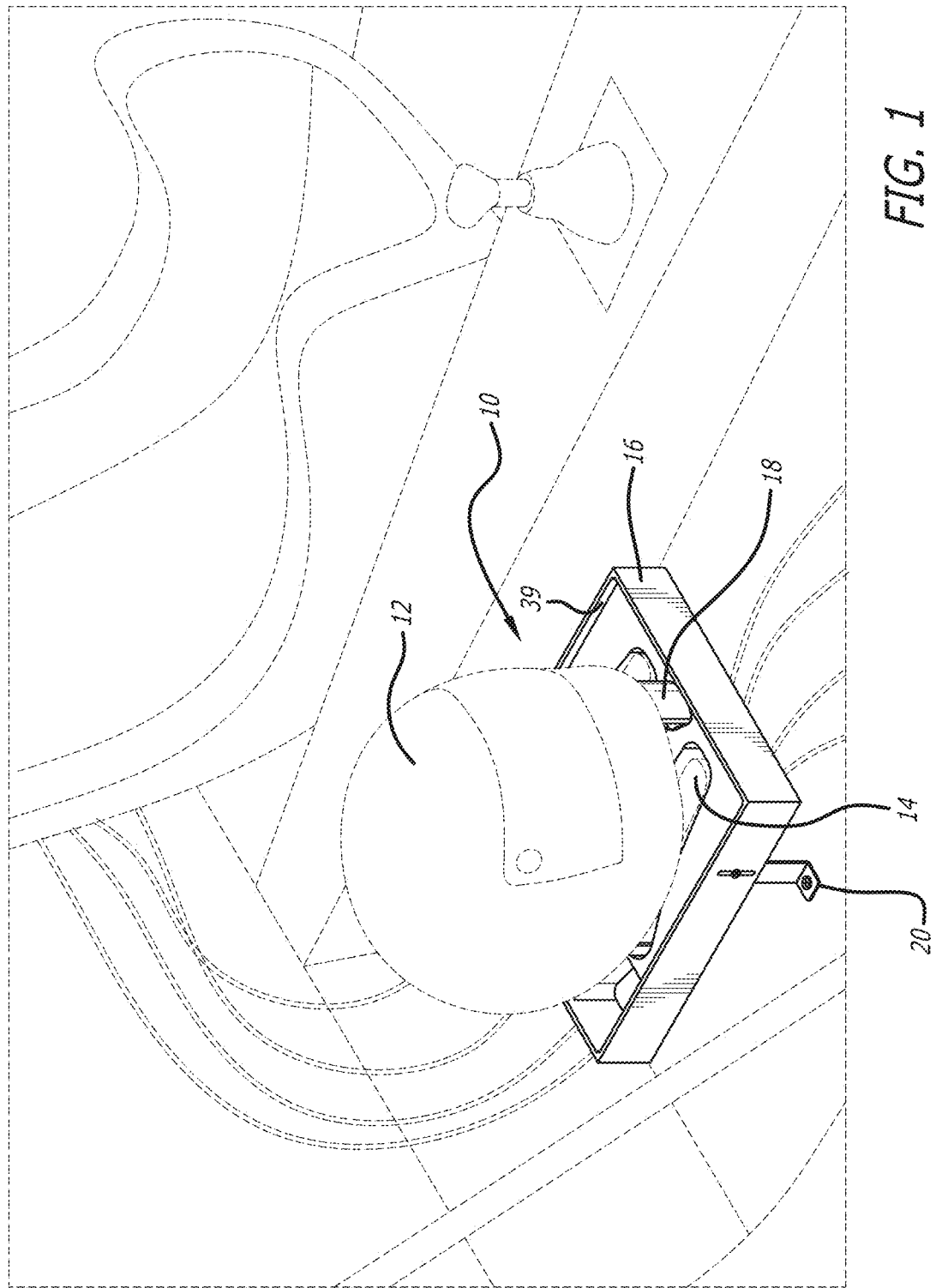
FIG. 1 is a front perspective view of an adjustable helmet and head and neck support device holder according to the present disclosure, shown in its environment of use.
Figure 2:
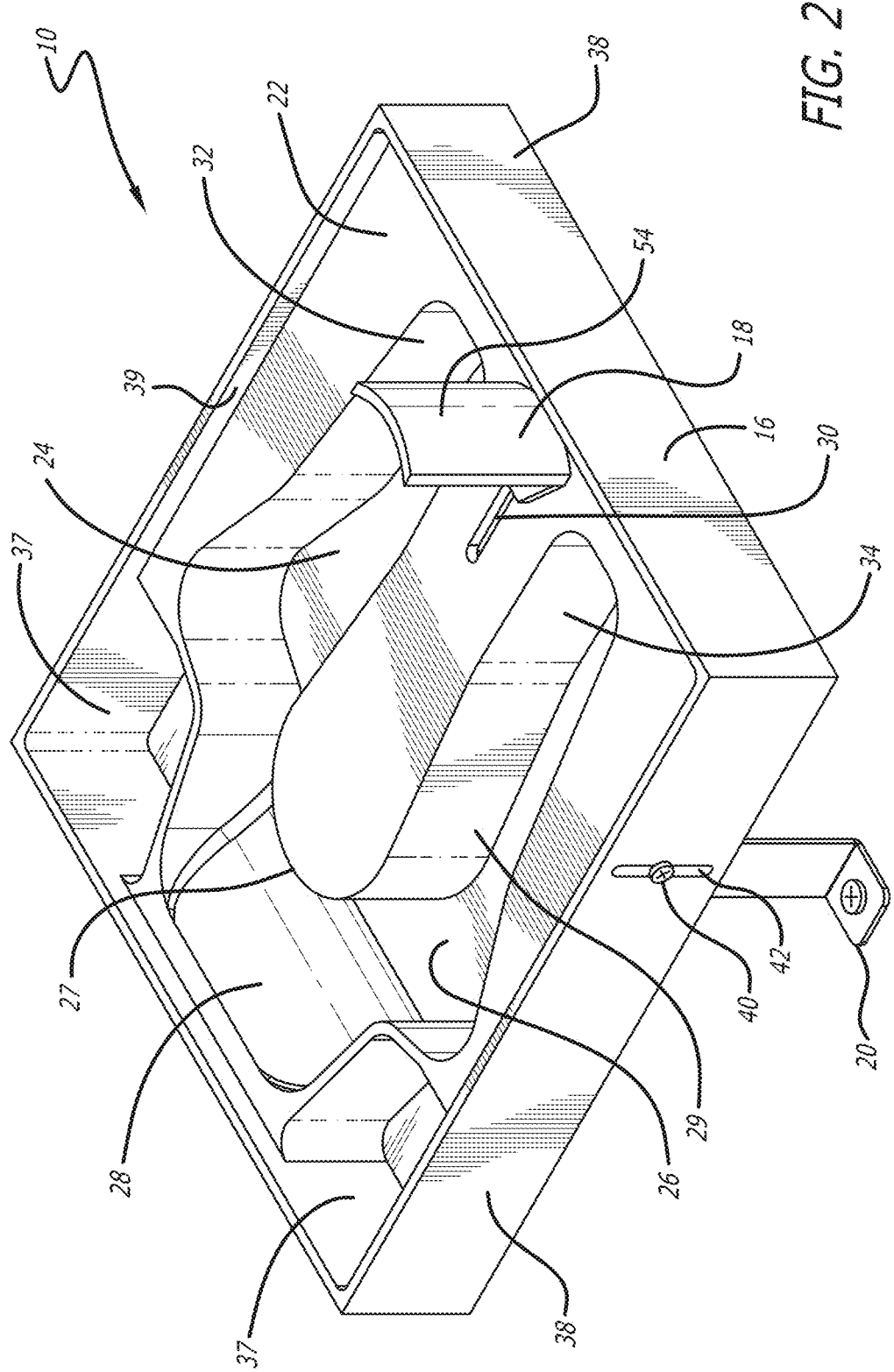
FIG. 2 is a front perspective view of one embodiment of the holder of FIG. 1.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Generally, this disclosure describes several embodiments of a holder 10 for a helmet 12, and preferably for a helmet 12 and head and neck support device 14, which is often connected to the helmet 12. Typically, as shown in FIG. 1, the holder 10 is utilized in vehicles, such as race cars, however, the holder 10 may be utilized outside of vehicles. As shown in FIG. 1, before and after racing the driver may not necessarily need to have the helmet 12 and head and neck support device 14 on their person. In addition, many of the helmets 12 and head and neck support devices 14 used by drivers are expensive. However, there often is nowhere for the driver to store the helmet 12 and head and neck support device 14 inside the race car, and thus when it is not on their person the helmet 12 and head and neck support device 14 often bounce around on the floor inside the race car, possibly damaging the helmet 12 and head and neck support device 14 and/or the vehicle. Accordingly, there is a need for a holder 10 for the helmet 12 and head and neck support device 14 that can accept a variety of different size helmets 12 and a variety of different size head and neck support devices 14, as well as a variety of different vehicle configurations and associated wiring, framework, etc. inside the vehicle.

Referring now to the figures, and initially to FIGS. 2-6, there is shown one embodiment of the holder 10 that comprises a base 16, a tongue 18, and supports 20.

In one embodiment, the base 16 has a top surface 22 with a cavity 24 extending into the base 16 from the top surface 22 and defined to receive a variety of different size head and neck support devices 14. In one embodiment, the cavity 24 is generally U-shaped with two arms 32, 34. A bottom wall 26 of the cavity 24 may be contoured to support the head and neck support device 14 therein. Additionally, a rear wall 28 of the cavity 24, positioned opposite an apex 27 of the interior wall 29, is preferably angled to also support the head and neck support device 14. Additional cavities 37 may be provided in the base 16 to receive and/or store personal items of the vehicle driver, such as gloves, ear plugs, balaclavas, etc.

Figure 6:
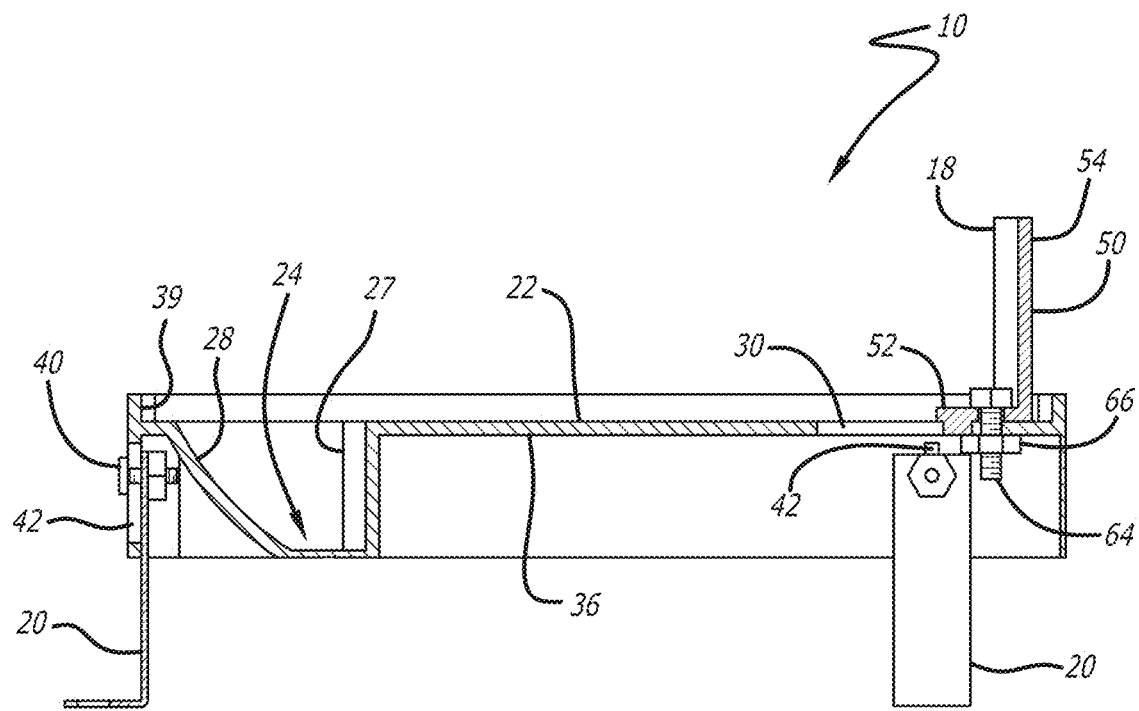
FIG. 6 is a cross-sectional side view of the holder of FIG. 5.

As show in FIGS. 2-4 and 6, in one embodiment, the base 16 has a slot 30 opposite the rear sidewall 28 of the cavity 24, and between the two arms 32, 34. In one embodiment, the slot 30 extends from the top surface 22 of the base 16 through to a bottom surface 36 of the base 16 as shown in FIG. 6. In one embodiment, the slot 30 is positioned adjacent the cavity 24 opposite the angled rear wall 28 of the U-shaped cavity 24. Additionally, the slot 30 may be positioned at least partially between the two arms 32, 34 of the U-shaped cavity 24.

The base 16 also preferably has side walls 38 about a perimeter thereof. The side walls 38 may be discrete individual walls, such as the four side walls 38 in the embodiment shown in FIGS. 2-4, or the side walls may be more integrated or may be a single side wall for the base 16. In one embodiment, the side walls 38 extend from the top surface 22 of the base 16 to the bottom surface 36 of the base 16. The base 16 may also have a lip 39 about a perimeter of the base 16 extending distal the top surface 22.

Figure 4:
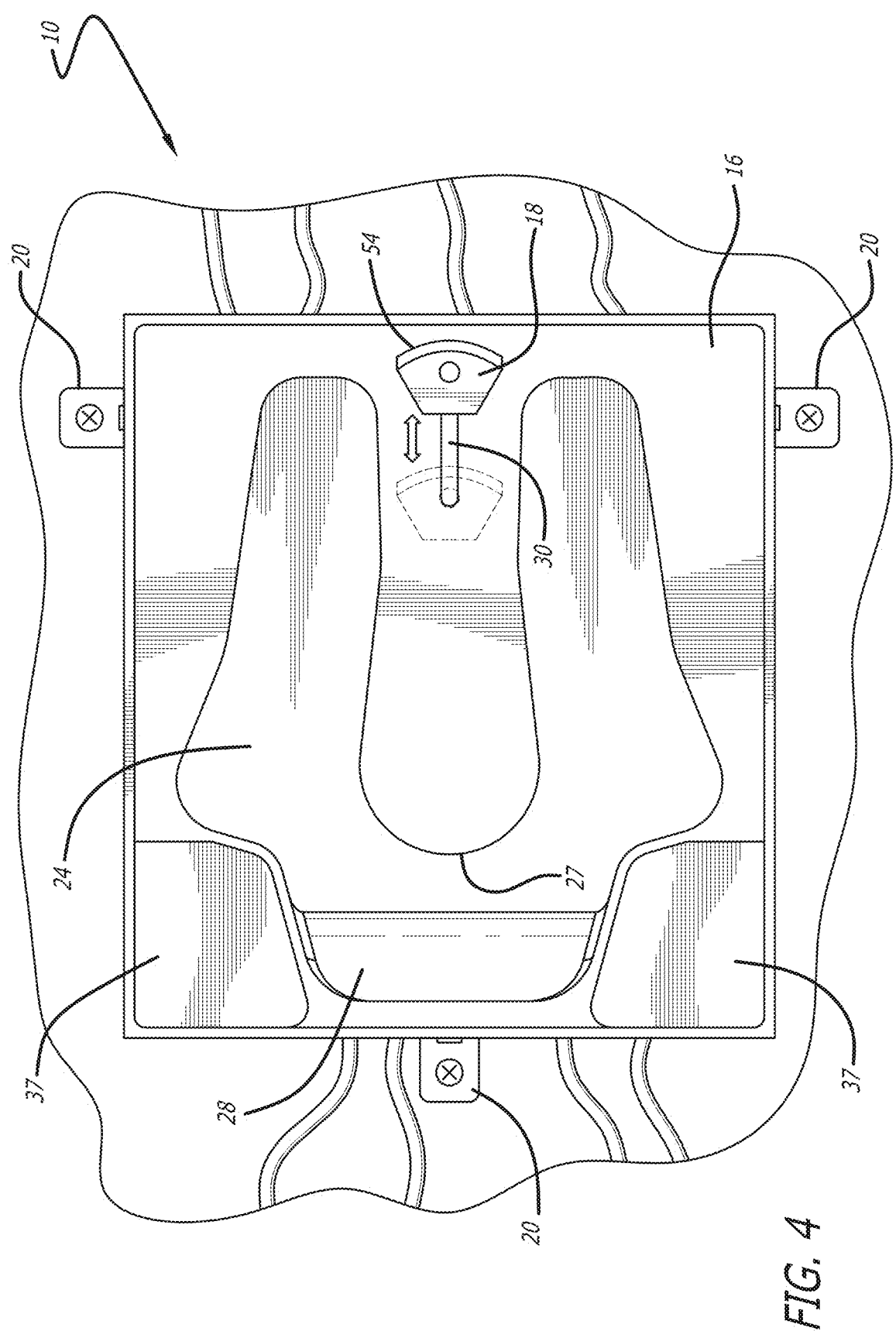
FIG. 4 is top plan view of the holder of FIG. 1 showing available movement of the tongue of the holder.

In one embodiment, the supports 20 are connected to the side walls 38 of the base 16. As shown in FIG. 4, typically more than one support 20 is utilized with the holder 10. In one embodiment, as shown, the holder 10 utilizes three supports 20, however, more or less supports 20 may be included with the holder 10. The supports 20 assist in securing the base 16, in one embodiment, to a vehicle, such as the floor inside the vehicle. Often, the floor on the inside of a vehicle is not flat, or wires, structural members, etc. may be interfering and not allow for the base 16 to be properly secured directly to the floor. Thus, the supports 20 assist in securing the base 16 in a raised position above such wires, structural members, etc. as shown in FIG. 1. In one embodiment, the sidewalls 38 have openings 42, such as a slot 42. Further, in one embodiment, the supports 20 comprise angle brackets with an opening to allow a fastener 40, such as screws or nuts and bolts as shown in FIG. 6, to be utilized to secure the support 20 in the appropriate location with respect to the base 16. Alternately, the supports 20 may have a series of apertures to allow for securing to the base 16 with hardware at different positions depending on the topography of the floor of the vehicle and any interfering items. In a preferred embodiment, receiving openings 42 in the side walls 38 of the base 16 are provided for receiving the hardware for securing the supports 20 to the base 16. Various methods of securing the supports 20 are available. For example, self-tapping sheet metal screws with and without rubber washers/grommets may be used. Alternately, the supports 20 may assist in securing the base 16 to locations other than a vehicle, for example on a workbench.

Figure 3:
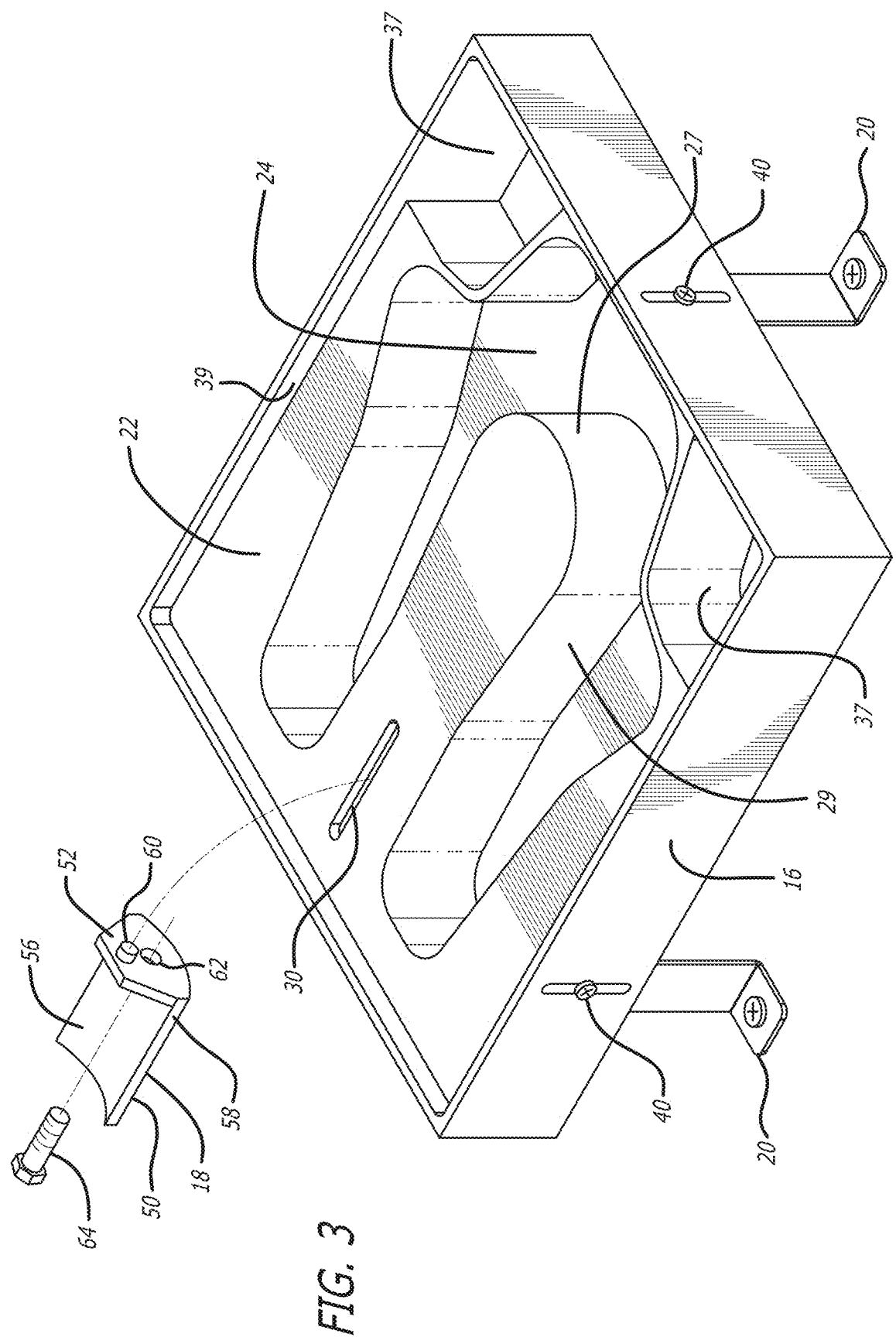
FIG. 3 is partially exploded rear perspective view of the holder of FIG. 1.

Referring to FIG. 3, in one embodiment, the tongue 18 comprises a post portion 50 and a flange portion 52 extending from the post portion 50. In one embodiment, the post portion has a convex outer surface 54 and a concave inner surface 56, however, other geometric configurations are acceptable. The flange 52 generally extends from a first end 58 of the post portion 50 and is preferably generally perpendicular to the post portion 50. The post portion 50 is used to engage the helmet 12, such as the inside front of the helmet 12 as shown in FIG. 1, and the flange 52 is used to moveably secure the tongue 18 to the base 16. As shown in FIG. 3, in one embodiment, a protrusion 60 extends from the flange 52 in a direction opposite the post portion 50. The protrusion 60 is configured to fit within the slot 30 in the base 16. The flange 52 also has an opening or aperture 62 extending therethrough to mate with a securing member 64 to secure the tongue 18 in place on the base 16.

Figure 5:
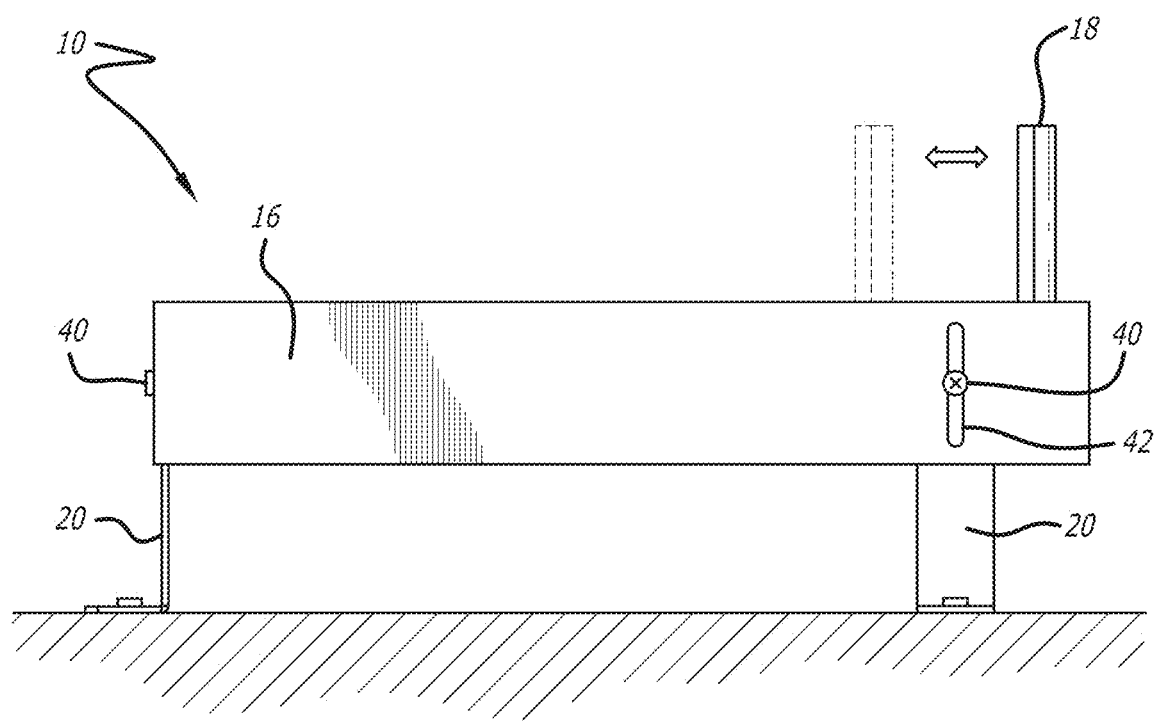
FIG. 5 is a side elevation view of the holder of FIG. 1 showing available movement of the tongue of the holder.

Referring to FIGS. 3 and 6, to assemble the tongue 18 onto the base 16, the protrusion 60 that extends from the bottom of the flange 52 is inserted into the slot 30 in the base 16. The tongue 18 is then orientated such that the convex outer surface 54 of the post portion 50 faces away from a center of the base 16 and away from the rear wall 28 of the cavity 24 of the base 16. A first securing member 64, such as a bolt, is positioned through the aperture 62 in the flange 52 and also through the slot 30. Alternately, the first securing member 64 may be connected to and extend from the bottom of the flange 52 and no aperture 62 may be required. Further alternately, the flange 52 may have a receiver instead of an aperture, to receive a threaded member or some other fastener that is inserted through the slot 30 from the bottom of the base 16. Accordingly, with both the protrusion 60 of the flange 52 and the first securing member 64 positioned within the slot 30 in the base 16 (and the securing member 64 extending through the aperture 62 in the flange 52, the tongue 18 is prevented from rotating within the slot 30. A mating second securing member 66, such as a nut, is generally secured to the first securing member 64 as shown in FIG. 6 to fix the tongue 18 in a specific linear position in the slot 30. However, the tongue 18 is able to move linearly about the slot 30, prior to being secured in place, as shown in FIGS. 4 and 5 for adjusting the distance between the apex 27 of the interior wall 29 of the cavity 24 in the base 16 and the tongue 18. It is understood that even after the second securing member 66 is secured to the first securing member 64 the tongue 18 may be linearly moveable within the slot 30 until tightened in place.

In use, typically the helmet 12 and head and neck support device 14 are secured together, such as with a strap. To place the helmet 12 and head and neck support device 14 in the holder 10, the head and neck support device 14 is positioned within the cavity 24. The helmet 12 will generally sit on the top surface 22 of the base 16. The post portion 50 of the tongue 18 extends upwards into the cavity of the helmet 12 and against the front interior portion of the helmet 12, such as adjacent where the chin of the user would normally reside. The position of the tongue 18 can be adjusted linearly within the slot 30, as discussed herein, to place a force against the interior of the helmet 12 to assist in securing the helmet 12 and head and neck support device 14 in place in the holder 10.

The embodiments detailed hereinabove may be combined in full or in part, with any alternative embodiments described.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the present disclosure may be embodied in other specific forms without departing from the spirit or central characteristics thereof. The present examples and embodiments, therefore, are to be considered in all respects as illustrative and not restrictive, and the claims are not to be limited to the details given herein. Accordingly, while the specific embodiments have been illustrated and described, numerous modifications come to mind without significantly departing from the spirit of the disclosure and the scope of protection is only limited by the scope of the accompanying claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A helmet holder comprising:
   a base having a top surface, a bottom surface and sidewalls about a perimeter thereof, the sidewalls extending from the top surface to the bottom surface;
   a u-shaped cavity extending into the base from the top surface, the cavity having a bottom wall;
   a tongue extending above the base; and,
   a plurality of supports to support the base, wherein the base has openings in the sidewalls and wherein the supports are secured to the base with fasteners extending through the openings in the sidewalls, respectively.

2. The helmet holder of claim 1, further comprising additional cavities extending into the base from the top surface of the base.

3. The helmet holder of claim 1, further comprising a lip about a perimeter of the base extending distal the top surface.

4. The helmet holder of claim 1, wherein the tongue has a curved outer surface.

5. The helmet holder of claim 1, wherein the supports comprise angle brackets, and wherein the supports have openings to secure the supports to a vehicle.

6. The helmet holder of claim 1, wherein the cavity has an angled rear wall opposite the tongue.

7. A helmet holder, comprising:
   a base having a top surface;
   a u-shaped cavity extending into the base from the top surface, the u-shaped cavity having two arms and a bottom wall;
   a tongue extending above the top surface of the base adjacent the two arms of the u-shaped cavity; and,
   a plurality of supports secured to the base to support the base.

8. The helmet holder of claim 7, wherein the base has a bottom surface and sidewalls about a perimeter thereof, the sidewalls extending from the top surface to the bottom surface.

9. The helmet holder of claim 7, wherein the cavity has an angled rear wall.

10. The helmet holder of claim 9, wherein the tongue is opposite the angled rear wall of the u-shaped cavity.

11. The helmet holder of claim 7, wherein the tongue has an angled outer surface.

12. The helmet holder of claim 7, wherein the base has sidewalls, wherein the sidewalls have openings, and wherein the supports are secured to the base with fasteners extending through the openings in the sidewalls, respectively.

13. A helmet holder comprising:
a base having a top surface;
a cavity extending into the base from the top surface, the cavity having a bottom wall;
a tongue extending above the top surface and adjacent the cavity; and,
a plurality of supports secured to the base to support the base, wherein the base has sidewalls, wherein the sidewalls have openings, and wherein the supports are secured to the base with fasteners extending through the openings in the sidewalls, respectively.

14. The helmet holder of claim 13, wherein the base further has a bottom surface and sidewalls about a perimeter thereof, the sidewalls extending from the top surface to the bottom surface.

15. The helmet holder of claim 13, wherein the cavity is u-shaped.

16. The helmet holder of claim 13, further comprising additional cavities extending into the base from the top surface of the base.

17. The helmet holder of claim 13, wherein the tongue is moveable.

18. The helmet holder of claim 13, wherein the tongue is fixed in place.

* * * * *